Feb. 23, 1932.  H. C. WADE  1,846,235
PROCESS FOR THE PRODUCTION OF OIL GAS
Filed May 2, 1928
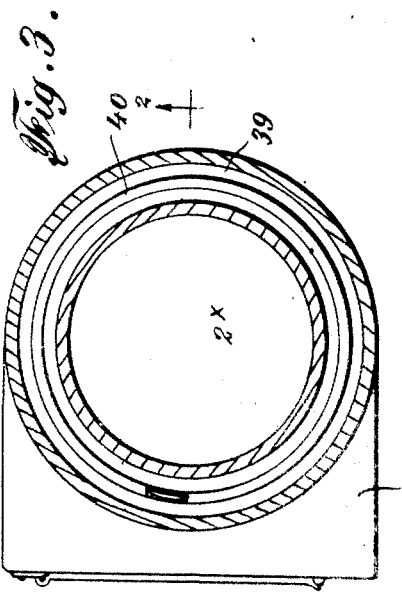
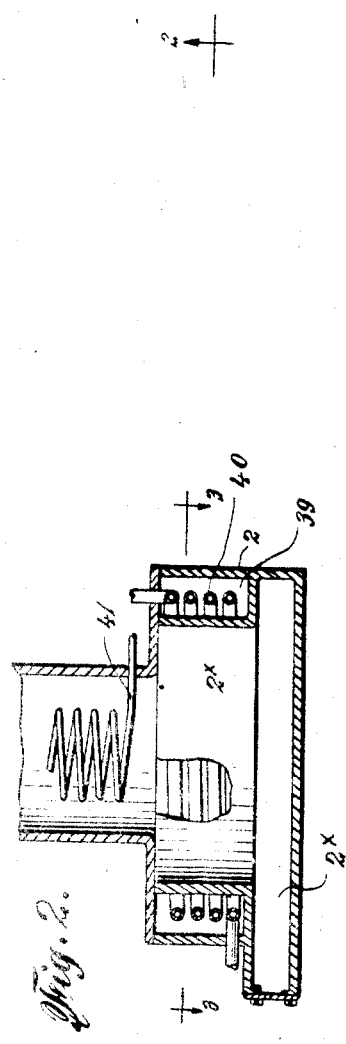
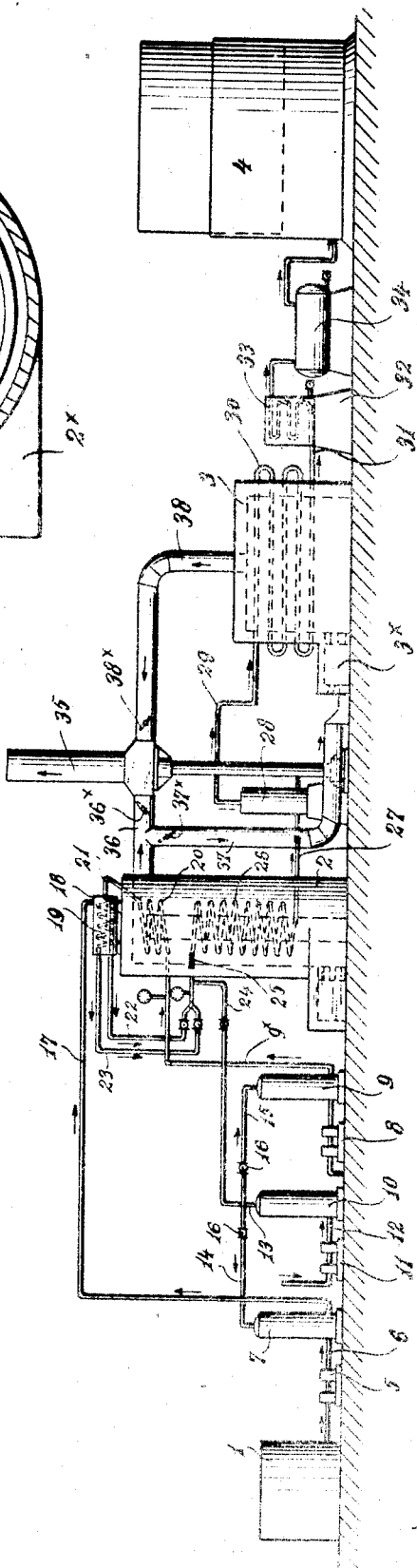
INVENTOR Patented Feb. 23, 1932

1,846,235

UNITED STATES PATENT OFFICE

HENRY CLAY WADE, OF LOS ANGELES, CALIFORNIA

PROCESS FOR THE PRODUCTION OF OIL GAS

Application filed May 2, 1928. Serial No. 274,391.

The object of the present invention is to provide a novel method for the production of hydrocarbon fuel gas in which carbonaceous material and water are subjected to vaporization under special conditions.

The invention will be described with reference to the accompanying drawings illustrating an apparatus for carrying out the process. In the drawings—

Figure 1 is a diagrammatic view in elevation of a gas producing plant;

Figure 2 is a sectional fragmentary elevation on the line 2—2, Fig. 3 of a gas furnace showing the position of a fixation coil, and Figure 3 is a horizontal section on the line 3—3, Figure 3.

Figure 3A is a fragmentary section through the vaporizing coil showing the catalyzer.

The present process is characterized by causing the travel of commingled carbonaceous material and water under a steaming temperature of the water, whilst the liquids are confined in an envelope which prevents expansion of the water into steam, to a chamber permitting the sudden expansion of the water into steam so as to thoroughly break up the carbonaceous material. The bodies are then caused to traverse a path in the presence of heat sufficient to convert the carbonaceous body into vapor and the water into superheated steam, the final major step in the process being the subjection of the vapors to the action of the catalyzer $a$ whereby steam is disassociated and the hydrogen content combined with free carbon vapors. The vapors thus treated are permitted to expand and condensate is drawn off.

The carbonaceous material may be fuel oil, gas oil, crude petroleum, liquefied coal, liquefied lignite, etc.

In describing the method, it is convenient to refer to the example plant illustrated in the drawings. I have shown at 1 an oil storage tank, at 2 a furnace, at 3 a fixation chamber, at 4 a gas storage tank. By means of the pump 5, I pass the oil from storage tank 1 through a pipe 6, leading to the oil feed tank 7. By means of a pump 8, I pump water to water feed tank 9. Near the water tank is an air pressure tank 10, the air being forced by compresser 11 through pipe 12 to the said tank 10.

The air tank is in communication by means of pipe 13 with a pipe 14 leading to the oil feed tank and with a pipe 15 to the water feed tank. Each of these tanks may be shut off from the air tank by closing one or two valves 16.

From oil feed tank 7, the oil passes through pipe 17 to a preheater 18. This preheater in the present instance is a small tank conveniently disposed at the top of the furnace 2 and having therein a small coil. Water passing from water feed tank 9 into a pipe $9^x$ is led into a heating coil 20 within the kiln near the top thereof and thence from the coil through a pipe 21 to heating coil 19 so that the oil within chamber 18 is preheated.

The oil passes from the preheater 18 through a pipe 22. The water passes from the coil 19 to a pipe 23. Each pipe leads to a nozzle and the nozzles eject into a junction pipe 24 which has an orifice 25 within the furnace and within the inlet of a coil 26. At the outlet end of the coil is disposed a catalyzer $a$ which will later be described.

The coil discharges into a pipe 27 leading to a knock-out box 28. Vapors pass from the top of the knock-out box to a pipe 29, leading to a coil 30 extending within the fixation chamber 3. Oil gases pass from the fixation chamber to a pipe 31 leading to a cooling condenser 32 and they pass from the coil 33 of the condenser to a residue tank 34 to storage tank 4.

The furnace 2 is provided with a stack 35, flue 36 being disposed intermediate the stack and the furnace and the flue having a downwardly extending sub-flue 37 communicating with the fire-box $3^x$ of the fixation chamber. At the top of the fixation chamber is a flue 38 communicating with stack 35. A damper $38^x$ controls flue 38, a damper $37^x$ controls sub-flue 37 and a damper $36^x$ controls flue 36.

The fixation chamber may be made a part of the furnace as is indicated in Figures 2 and 3. The fire-box of the furnace is indicated at $2^x$ and surrounding the same is the fixation chamber 39 having a fixation coil 40, the main coil being diagrammatically indicated at 41.

By such arrangement convenience and economy is secured in the relation of the fixation chamber to the kiln and the main treating coil.

In the operation, the oil or carbonaceous material is passed by the pressure mediums above described to preheating tank 18 and the water is passed under pressure to the heating coil 20. The pressure within air tank 10 may be 80 to 100 pounds per square inch for example. I prefer to heat the water to approximately 400° F. at the point of its emergence from the heating coil 20. Tank 18 is a heat exchange element, the oil absorbing heat from the water coil 19 so that when the oil and water reach the nozzles at junction pipe 24 they are at approximately 200° F. The pipes 22, 23, may be ½″ in diameter and the nozzles at the ends of pipes 22, 23, may be ¼″. The junction pipe 24 may be ¼″ having its orifice 25 reduced to ⅛″. The coil 26 may be 2½″ internal diameter and may be 106 lineal feet.

The temperature within the furnace may be 1600° F. at the top of the fire-box, 1200° F. at the centre of the furnace, 800° at the top, although this heat range may be substantially varied according to the substances treated.

By the means just described I am enabled to confine the water from coil 20 to orifice 25 in an envelope which prevents its expansion into steam although the water is under a heat range from 400° F. at the top of the furnace to 250° F. at the orifice. The oil and water being commingled by the junction pipe 24 and being discharged in such condition at the orifice into a chamber (coil 26) of adequate size to permit sudden and free expansion, enables explosive action of the steam upon the oil, or other carbonaceous material, within the coil 26. The oil is by such means "broken up", thoroughly disseminated and the water vapor acts as a carrier therefor in the coil. Not only is the oil or other carbonaceous material placed in an ideal condition for heat treatment but in such condition that no carbon is formed within the coil.

The catalyzer a is preferably formed of a nichrome alloy treated wire coiled or otherwise formed so as to expose a maximum surface in proportion to mass. I found that in a plant of the proportions specified, a catalyzer of approximately 8–10 ounces will suffice for a single coil. It will be understood that a plurality of coils may be placed within a single kiln in nested or other suitable form.

I have established by operations and analysis that the catalyzer has the effect of disassociating steam into its elements and causing combination of the hydrogen with free carbon vapors from the carbonaceous material.

The gas is passed from the coil 26 to a knock-out box 28 where the gases and vapors expand and condensate is taken out. The gas and vapors then pass to the fixation chamber where additional heat is supplied to expand the vapors to a fixed permanent gas, a slight condensate being removed by cooling condenser 32, the final product passing into storage tank 4. Without washing, scrubbing or other purification I have obtained by the method using a low grade asphaltic base fuel oil, a fixed gas having the following analysis:—

| Constituents | Per cent by volume |
|---|---|
| Carbon dioxide ($CO_2$) | 0.2 |
| Unsaturated hydrocarbons ($C_nH_{2n}$) | 35.1 |
| Oxygen ($O_2$) | 0.2 |
| Hydrogen ($H_2$) | 21.4 |
| Carbon monoxide ($CO$) | 0.5 |
| Ethane ($C_2H_6$) | None |
| Methane ($CH_4$) | 40.0 |
| Nitrogen ($N_2$) | 2.6 |
| Total | 100.0 |

Observed B. t. u. by calorimeter test, 1352 per cubic foot.

By closing damper 36× and opening damper 37× the hot flue gases may be carried into the fixation chamber and after imparting heat to coil 30 may pass out of stack 35 via flue 38.

A burner in fire-box 3× may add any heat required in the fixation chamber in addition to the flue gases. I desire that the temperature within fixation coil 30 be 900°–1200° F.

It will be understood that the plant illustrated in the drawings is shown largely diagrammatic and that various modifications and re-arrangements of the elements may be made without departing from the spirit of the invention, what I claim and desire to secure by Letters Patent being as follows:—

A process of producing oil gas, which comprises preheating oil by heat exchange with heated water, mixing the heated oil and water after the heat exchange, passing the heated mixture of oil and water at a temperature of approximately 200° F. into a heated coil, vaporizing the mixed oil and water in the heated coil in contact with a nichrome catalyst, passing the vapors through an expansion chamber whereby the vapors are expanded and liquid condensate removed, then passing the vapors into a fixing coil and heating the vapors to a temperature of above 900° F. whereby the vapors are gasified.

In testimony whereof, I have signed my name to this specification.

HENRY CLAY WADE.